United States Patent [19]
Singh et al.

[11] 4,439,249
[45] Mar. 27, 1984

[54] AUTOMATED CUTTING OF PLATE STEEL

[75] Inventors: Gurvinder P. Singh; William D. Jolly, both of San Antonio, Tex.

[73] Assignees: Victor Equipment Company, Denton, Tex.; ESAB North America, Inc., Fort Collins, Colo.

[21] Appl. No.: 506,863

[22] Filed: Jun. 22, 1983

[51] Int. Cl.³ .............................................. B23K 7/02
[52] U.S. Cl. ...................................... 148/9 R; 266/76
[58] Field of Search .............................. 148/9; 266/76

[56] References Cited
U.S. PATENT DOCUMENTS

| | | | |
|---|---|---|---|
| 2,747,152 | 5/1956 | Greene | 148/9 |
| 2,949,391 | 8/1960 | Anderson | 148/9 |
| 3,668,108 | 6/1972 | Arata et al. | 148/9 |
| 4,328,049 | 5/1982 | Richardson | 266/76 |

Primary Examiner—W. Stallard
Attorney, Agent, or Firm—Wofford, Fails & Zobal

[57] ABSTRACT

Method and apparatus for automated cutting of metal plates in which fuel and oxygen adjustments, as well as other parameters are controlled automatically responsive to temperature sensed at a plurality of points near where the cut is being made; for example, at the front shoulder of the kerf at the surface and behind the tip down in the kerf. Also disclosed are specific preferred embodiments, including the use of microprocessor, algorithms, programs and temperature sensor locations and connections.

27 Claims, 7 Drawing Figures

DIRECTION OF CUT

AUTOMATED CUTTING OF PLATE STEEL

FIELD OF THE INVENTION

This invention relates to methods and apparatuses for cutting of metallic plate. More particularly, this invention relates to automated control systems and methods for controlling cutting oxygen, pre-heat, and torch speed if feasible.

DESCRIPTION OF THE PRIOR ART

The prior art has seen the development of a wide variety of different types of torches and torch tips, torches adapted to operate on different fuels and oxygen and the like; but has seen relatively little work done in the field of automating control of the torches. Instead, prior art torches have generally relied upon experienced and skilled operators to sense by the sound and appearance of the flame when optimum cutting conditions were right. A pre-examination search showed there were three United States patents that disclosed systems for attempting to control one or more of the variables in the automated welding process. U.S. Pat. No. 2,089,015, issued Aug. 3, 1937, to J. H. Bucknam et al discloses a control system for welding and cutting machines by varying the speed at which the work was moved relative to the welding means; for example, the oxygen-acetylene flame or the electric arc welding. U.S. Pat. No. 2,177,276, issued Oct. 24, 1939 to J. H. Bucknam, disclosed a method for controlling the heating, welding, de-surfacing or cutting process and apparatus by eliminating excess carry-over heat and wasted fuel and oxygen through continuing to operate the flame after the de-surfacing or metal removing operations were completed. Specifically, it employed a temperature indicator to measure when the flame came to the end of the work piece and, thereafter, turn off the fuel gas and oxygen. U.S. Pat. No. 3,290,032, issued Dec. 6, 1966 to F. Brouwer, disclosed a transducer for controlling the height that a tip was maintained above the work piece.

Applicants have done an extensive study of the literature and their bibliography shows only about 18 references discussing the theoretical aspects of welding, metal fabrication, cutting and the like. Even some of those were two part discussions and did not indicate that any inventor has attempted to investigate the multiplicity of parameters and effect an automated control method and apparatus.

SUMMARY OF THE INVENTION

Accordingly, it is an object of this invention to delineate parameters that can be employed as process control signals and to delineate the inventive method and apparatus employing these parameters to provide a sophisticated, fully automated, real time, closed loop control of a method of cutting metallic plate, such as steel plate.

It is a specific object of this invention to provide method and apparatus which obviates the disadvantages of the prior art and employs at least two temperature parameters to automate the method and apparatus for controlled cutting of plate steel.

These and other objects will become more clearly apparent from the descriptive matter hereinafter, particularly when taken into conjunction with the appended drawings.

In accordance with one aspect of this invention, there is provided an improvement in a method of cutting metal plate in which fuel and oxygen are admixed and burned as they exit from a torch tip and a pre-heat flame for heating the metal plate; in which cutting oxygen is directed through the hot molten metal plate to complete a cut therethrough, in the process forming a kerf; and in which the torch tip is moved along a predetermined path to cut the metallic plate therealong. The improvement comprises automating the process by sensing the temperature at a plurality of points adjacent the top and in the kerf of the cut of the metal plate and, responsive to the sensed temperatures, making appropriate pre-designated changes to effect more nearly optimum cut quality of the steel plate. Specific pre-programmed algorithms, locations of the temperature sensors and the like are delineated hereinafter.

In another aspect of the invention, there is provided an improvement in apparatus for cutting metal plate, which apparatus includes an oxygen source and supply passageway for pre-heat oxygen and cutting oxygen; fuel source and supply passageway for pre-heating the metal plate; cutting oxygen valve; pre-heat oxygen valve; fuel valve; torch tip connected by respective passageways with the valves and having respective pre-heat and cutting oxygen passageways; and moving means for moving the torch tip along predetermined path. The improvement comprises a first means for controlling the cutting oxygen valve; second means for controlling the pre-heat fuel and oxygen valve; a plurality of temperature sensors placed and directed to sense a temperature at the surface near the shoulder of the kerf front and in the kerf, respectively; and control means connected with the temperature sensors and drivingly connected with the first and second means and adapted to control respective ones of the valves responsive to the temperatures sensed in relation to predetermined standards.

In specific aspects, the second means incorporates a third means and the pre-heat fuel and oxygen valves are controlled individually and respectively by the second and third means. In further specific embodiments, a fourth means is provided for controlling the rate of movement of the moving means and the control means is drivingly connected also with the fourth means for controlling the rate of movement, also, in response to the temperatures sensed. The control means includes pre-programmed algorithm and microprocessor employing the same for determining the respective directions of control of the respective means in response to the parameters, including the sensed temperatures.

DESCRIPTION OF PREFERRED EMBODIMENT(S)

The following descriptive matter amplifies in a detailed way the broad general statements of method and apparatus under the summary of the invention.

Figure 1:
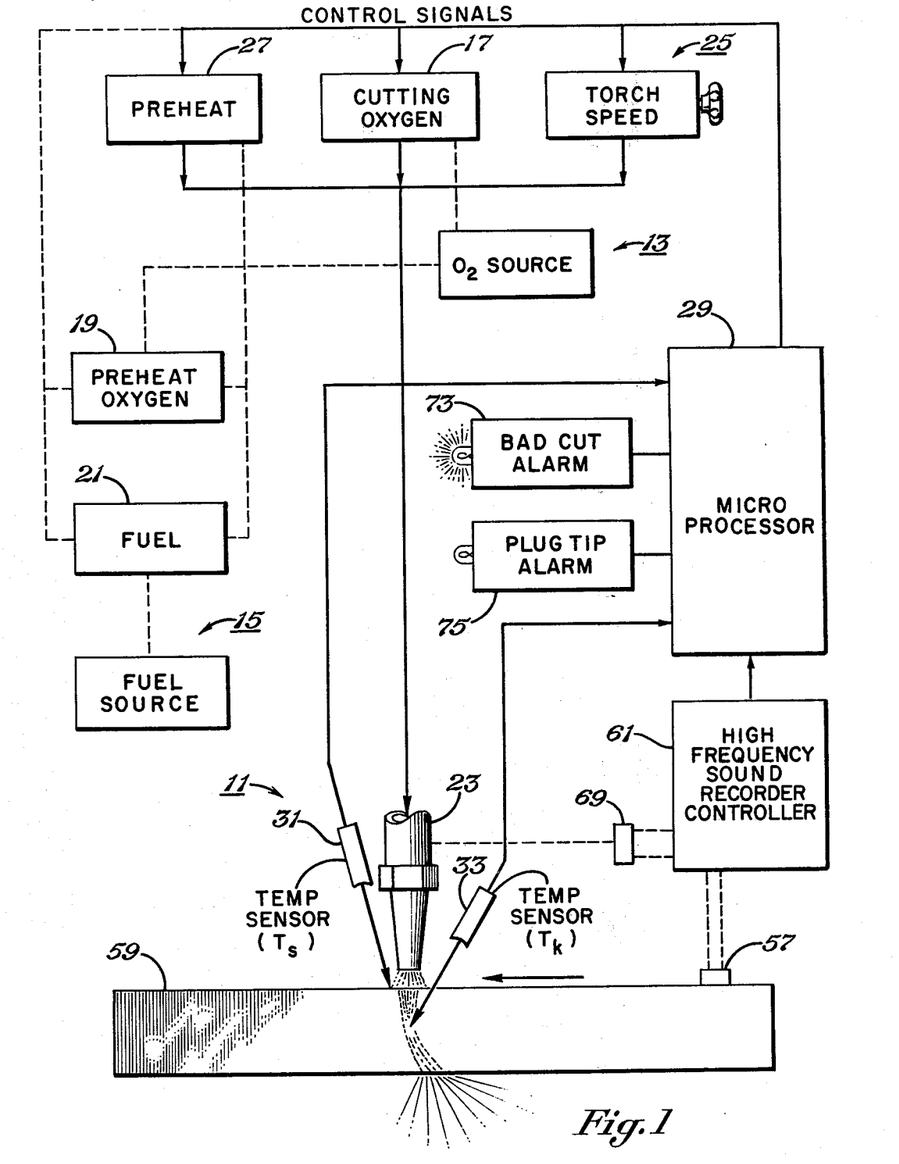
FIG. 1 is a schematic illustration of one embodiment of this invention.

Referring to FIG. 1 for one embodiment of the invention, the apparatus 11 includes an oxygen source ($O_2$ SRCE) and passageway 13 for preheat oxygen and cutting oxygen; fuel source and passageway 15 for preheating the metal plate; cutting oxygen valve 17; preheat oxygen valve 19; fuel valve 21; torch tip 23 connected by respective passageways with the valves and having respective preheat and cutting oxygen passageways; and moving means 25 for moving the torch tip along a predetermined path.

The oxygen source and supply passageway 13 are conventional and need not be described in detail herein. It is sufficient to note, that, ordinarily, the oxygen source and supply passageway 13 will include high pressure bottled oxygen; for example, a high pressure container able to hold oxygen at about 3000 pounds per square inch and the requisite pressure regulators, hoses and the like for connecting the oxygen source with the respective valves.

Similarly, the fuel source 15 may comprise a conventional high pressure fuel source; for example, high pressure cylinder of acetylene, propane or other fuels; and pressure regulator and hoses to connect it into the preheat fuel valve for use.

The cutting oxygen valve 17, similarly, may comprise any conventional cutting oxygen valve that is amenable to automated control, as by solenoids, pneumatic pressure, electronic signals or the like.

The preheat oxygen valve and the fuel valve may be the types of valves that are subject to automated control, as shown in dashed lines in FIG. 1; or they may be manual valves that are preset to a predetermined proportion and an intermediate preheat valve 27 interposed downstream in the fuel and oxygen mixture to control the flow of that mixture when it has already been preproportioned. As illustrated in the solid lines, the fuel and preheat oxygen valves will be manually set, as by an experienced operator initially; and, thereafter, the preheat valve 27 will be controlled automatically by control signals from the microprocessor as delineated in the improved embodiment described hereinafter. Of course, where the individual preheat oxygen valve and the fuel valve are controlled by the control signals individually, as shown in the dashed lines of FIG. 1, they must be the type valves that can be so automated. Typically, these type valves will be proportioning control valves to be controlled by pneumatic pressure or be stepped responsive to computer signal output, such as electronic signal from the microprocessor.

The torch tip 23 may comprise the conventional type torch tips employed in this art. For example, the manifolded machine torches can be employed requiring machine torch tips where plural automated cutting of large expanses of steel plate is effected at the same time. As illustrated in FIG. 1, a single torch tip is controlled so that it may be a machine torch tip or a conventional torch tip. The selection of the torch tip is well known to those skilled in this art and it need not be changed in this invention, although this invention may also employ special torch tips, as described hereinafter with respect to FIGS. 5 and 6 in which a temperature sensor is embedded in the torch tip or holder for sensing the temperature in the kerf of the cut through the metallic plate.

The moving means 25 may comprise any of the conventional types of prior art means for moving the torch tip along the surface. For example, it may comprise a wheel that is powered by an electric motor driven responsive to output signals from the microprocessor or it may comprise any other type of motor with suitable means for altering the torch speed in the embodiment of FIG. 1.

The primary improvement in this invention comprises the respective control signals from the microprocessor that form respective first and second means for controlling the cutting oxygen valve and for controlling the preheat fuel and oxygen valves, respectively. Of course, where the preheat fuel and oxygen valves are individually controlled, second and third means are formed by respective signals from the microprocessor 29.

The improvement also includes a plurality of temperature sensors placed and directed to sense the temperature at the surface near the shoulder of the kerf front and in the kerf, respectively, and control means connected with the temperature sensors and drivingly connected with the first and second means and adapted to control respective ones of the valves responsive to the temperatures sensed in relation to predetermined standards. In the illustrated embodiment, the plurality of temperature sensors are indicated by the temperature sensor 31 ($T_s$) and 33 ($T_k$); and the control means is illustrated by the microprocessor 29 and respective output control signals and their control receptors (not specifically shown).

The temperature sensors may comprise any of the conventional type of sensors employed for sensing temperature (TEMP). Whereas the ordinary type of conductive sensor is employed in lower temperatures and illustrated by thermocouples or the like, the temperatures that are encountered in welding are generally high enough that electromagnetic energy sensors such as infra-red (IR) sensors can be employed to obtain electrical output indicative of the temperature being monitored. As illustrated, the temperature sensor 31 is emplaced to monitor the temperature at the shoulder of the kerf. This temperature sensor must be monitored within ten inches to obtain any sort of reliable monitoring that is not subject to atmospheric conditions. Preferably, the temperature is within one-quarter inch of the temperature at the shoulder of the kerf in order to alleviate difficulties with changes in temperature that occur under ambient conditions as the weather changes and the like. Temperature sensor 33 measures the temperature in the kerf and is less susceptible to ambient changes where it is directed downwardly into the kerf for sensing the spectral frequency and amplitude of the light emitted. Preferably, the temperature sensor 33 is directed to sense the temperature below the mid point of the cut in the kerf in order to be more nearly accurately responsive to the actual temperature encountered in the kerf. Of course, the temperature at the bottom of the kerf can be sensed. Other points that give an accurate reading of the cutting conditions can also be employed and sensed by the temperature sensors.

The control means includes a pre-programmed algorithm for determining the respected directions of control of the valves responsive to the respective temperatures sensed with respect to the standards. In the embodiment of FIG. 1, the following algorithm is pre-programmed into the microprocessor 29.

ALGORITHM 1

$T_k$ = temp. in the kerf
$T_s$ = temp. at surface on shoulder of kerf front
hi = high, lo = low, ok = within respective predetermined standards

| CONDITION | RESPONSE |
| --- | --- |
| $T_k$ = hi & $T_s$ = lo | reduce speed of movement of torch tip |
| $T_k$ = ok & $T_s$ = lo | increase preheat, including both fuel and oxygen |
| $T_k$ = hi & $T_s$ = ok | increase cutting oxygen |
| $T_k$ = ok & $T_s$ = hi | reduce preheat |
| $T_k$ = lo & $T_s$ = hi | increase speed |
| $T_k$ = lo & $T_s$ = ok | reduce cutting oxygen |
| $T_k$ = hi & $T_s$ = hi | reduce preheat |
| $T_k$ = lo & $T_s$ = lo | increase preheat |
| $T_k$ = ok & $T_s$ = ok | no change |

Figure 2:
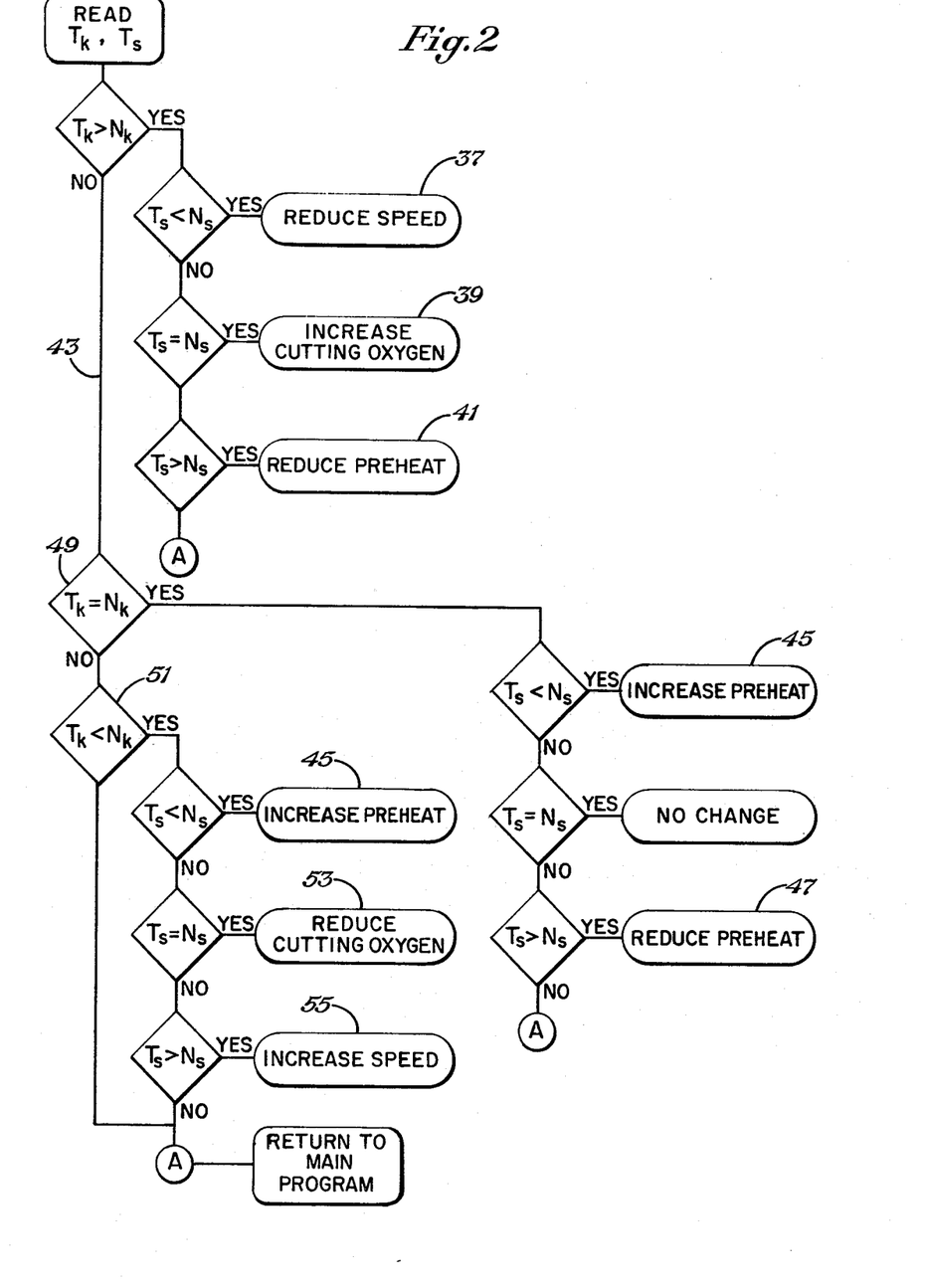
FIG. 2 is a flow diagram for automated control of the cutting process by controlling pre-heat and cutting gas flows and speed of torch movement.

A second half of a flow diagram for the microprocessor to carry out the algorithm is illustrated in FIG. 2 and is initiated after the torch tips are set up initially by turning on the respective oxygen, fuel, pre-heat fuel, preheat oxygen and, after the plate has reached kindling temperature, the cutting oxygen valve. Reference temperature $N_k$ for temperature $T_k$ and the reference temperature $N_s$ for $T_s$ will have already been set into the microprocessor as a part of the standards. As can be seen from FIG. 2, the microprocessor 29 then reads the respective temperatures $T_k$ and $T_s$. First the temperature $T_k$ is compared with the reference kerf temperature $N_k$. If it is greater than $N_k$ then the program follows the route for "yes" and compares the temperature $T_s$ to see if it is less than the surface temperature standard $N_s$. If it is less then the speed is reduced, as shown by block 37.

If the answer is no, temperature $T_s$ is compared to see if it is equal to $N_s$. If $T_s$ is equal to $N_k$ then the cutting oxygen is increased as shown by the block 39. If the answer is no and the $T_s$ is greater than $N_s$ the preheat is simply reduced one increment as indicated by the block 41. The microprocessor then returns to the main program A.

In the event that the kerf temperature $T_k$ is not greater than $N_k$ the program proceeds along the path 43 and the temperature $T_k$ is compared with the normal temperature $N_k$ to see if it is equal to the reference temperature. If it is, then the computer program requires an exit along the line marked "yes" and the temperature $T_s$ is again compared with the standard temperature $N_s$. If it is less than $N_s$ the preheat is increased, as indicated by block 45. When the preheat is increased, of course, both fuel and oxygen are increased. As indicated hereinbefore, this can be done with separate controls on the respective fuel and oxygen valves or it can be done on an interposed preheat valve that simply admits more of both the fuel and oxygen in the predetermined portion priorly set into the fuel and oxygen preheat valves. If $T_s$ is not less than $N_s$ the path marked "no" is followed and again compared. If $T_s$ is equal to $N_s$, or at the standard, no change is made since all of the parameters are as desired. If "no", then the temperature at the surface $T_s$ is compared to see if it is greater than the reference $N_s$. If it is, then the preheat is reduced, as shown by block 47. Again, both preheat oxygen and preheat fuel are reduced, conversely to the operation described hereinbefore with respect to increasing the preheat. If $T_s$ is not greater than $N_s$ the program returns to the main program A.

In a similar manner, if the kerf temperature is not equal to the standard, then the path marked "no" is followed downwardly from the block 49 to the block 51 and a comparison is made to see if $T_k$ is less than $N_k$; that is, the kerf temperature is less than the standard. If it is, then a comparison is made to see if surface temperature is less than the standard for surface temperature. If it is, then the preheat is increased, as shown by block 45. If, on the other hand, it is not, the route "no" is followed. If $T_s$ is equal to the standard, then the cutting oxygen is reduced, as shown by block 53. If the answer is "no", the program compares the surface temperature with the standard to see if it is higher than the standard. If it is, then the speed of the torch is increased as shown by the block 55. If it is not then there is exit made to return to the main program A.

In the embodiment of FIG. 1, acoustic emissions are monitored as a parameter to show when the cut goes bad and as a measure of when a tip is plugged. Specifically, a first acoustic emissions sensor 57 is emplaced adjacent the surface of the metallic plate 59 and is connected with the control means in the form of high frequency sound recorder 61 which is connected to the microprocessor 29. The theory in operation of this acoustic emissions monitor may be understood more nearly completely by referring to FIG. 7 also. Therein, the first acoustic emissions sensor 57 is emplaced adjacent the plate 59. It is connected with a preamplifier 63 which is, in turn, connected with RMS module and microprocessor 65. A chart recorder 67 is employed to illustrate how anomalies (peaks) occur such that they can be analyzed to obtain outputs to activate either the bad cut alarm or the plugged tip alarm as will become clearer hereinafter.

Specifically, a second acoustic emissions sensor 69 is employed adjacent the torch tip 23 so as to monitor the acoustic emissions therefrom. The second acoustic emission sensor 69 is also connected with a control means in the form of a sound recorder 61 and a microprocessor 29, shown by the specific preamp 71, RMS module and microprocessor 65 and chart recorder 67 in FIG. 7. The acoustic energy that is monitored is in the range of 50 kiloHertz (kHz) to 1 megaHertz (MHz). The preamplifier has a capability of 40 decibels (dB) gain in a frequency range being monitored to condition the signal before connecting it to the RMS module and microprocessor 65. The frequency for normal operation is set into the microprocessor and the high frequency sound recorder 61, per se, or into the RMS module and microprocessor 65. When the frequency departs the standard, it shows that a bad cut has been effected, if detected by the first AE sensor 57; or that there is a plugged tip, if detected by the second AE sensor 69. Consequently, the microprocessor 29 energizes either the bad cut alarm if the acoustic energy departure is detected by the first sensor 57 or energizes the plugged tip alarm if detected by the second sensor 69.

Figure 7:
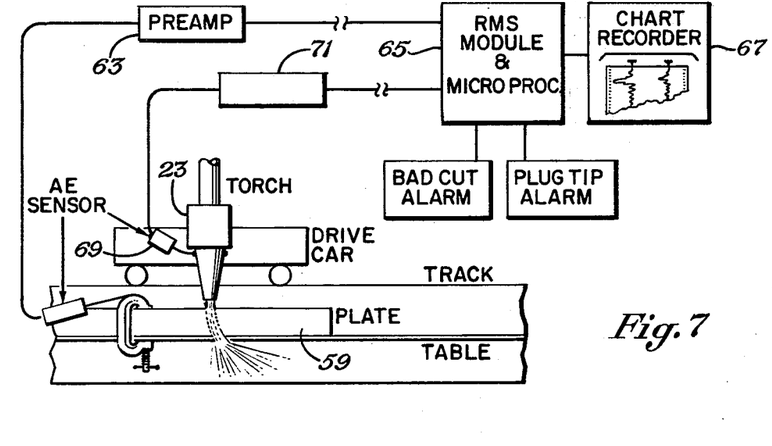
FIG. 7 is a schematic illustration of an embodiment of this invention employing acoustic emission sensors mounted on the torch and plate to monitor the changes in the characteristic sound as the cut progresses and to detect a bad cut and to detect a plugged torch tip.

The acoustic energy emission is not employed as a control parameter, per se; because it denotes an event that has already happened. On the other hand, the parameter of the temperatures being sensed at the top and down in the kerf denote variance before a malfunction occurs and, therefore, are better control variables. Specifically, the bad cut alarm 73 is connected with the microprocessor 29 so as to be responsive to an appropriate signal from the first acoustic emissions sensor 57 showing that there has resulted a bad cut. Similarly, the plugged tip alarm 75 is connected with the microprocessor 29 so as to be responsive to a signal from the second acoustic emissions monitor, or sensor, 69.

The RMS module is designed to be sensitive to acoustic energy in a range from 50 kiloHertz to 500 kiloHertz. The exact frequency of the acoustic energy being emitted may vary slightly depending upon the plate thickness and the torch tip design but for each combination there will be a unique optimum frequency amplitude when this frequency range is being monitored. Upon the occurence of a bad cut, the amplitude will depart this optimum amplitude in a dramatic way. For example, the amplitude will increase significantly as shown in FIG. 7 to show that the cut has gone bad. In a like manner, amplitude will increase to show that a tip has become plugged when monitored by the second acoustic energy sensor 69. There may be circumstances where the amplitude would diminish significantly from the preset standard and thereby cause energizing of the respective alarms.

An alternate operation of the embodiment of FIG. 1 will be described later hereinafter in conjunction with the operation of the embodiment of FIG. 3, since the overall process is substantially similar in each case.

Figure 3:
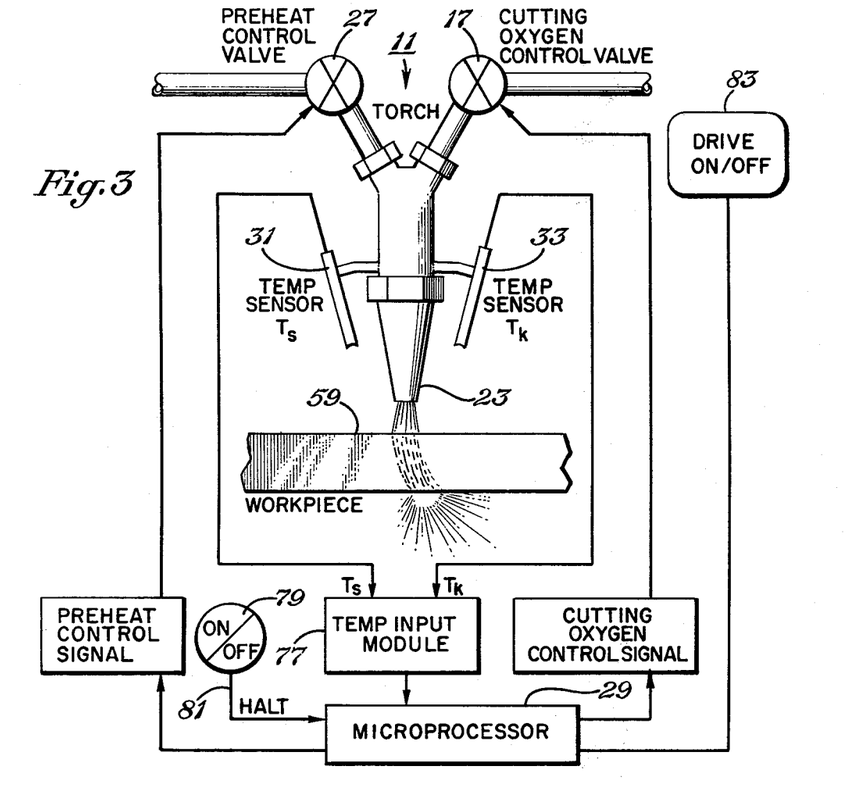
FIG. 3 is a block diagram, partly schematic, showing the cutting torch control system used to maintain quality of the flame cut surface by controlling pre-heat and cutting oxygen gas flows.

In FIG. 3 there is illustrated schematically a block diagram of the apparatus of this invention for maintaining quality of the flame cut by controlling preheat and cutting oxygen gas flows. This operation is employed with a different algorithm; and is employed when a plurality of the respective tips are ganged together on a bar or the like such that a plurality of cuts are being made simultaneously. In these instances it is difficult to adjust the speed of an individual torch tip so it is preferred to employ a control that compensates for the speed.

In this embodiment, similarly as with FIG. 1, the acoustic emissions can be monitored and an appropriate alarm sounded if the cut goes bad or if the torch tip being monitored becomes plugged. For clarity of illustration, this duplicating acoustic emissions network, which has been shown in FIGS. 1 and 7, is omitted from the embodiment of FIG. 3. This does not affect the other elements of FIG. 3 in any adverse sense.

Similarly, in FIG. 3 the respective fuel and oxygen passageways and sources, per se, are not shown but are understood to be connected similarly as described with respect to FIG. 1. In the embodiment illustrated in FIG. 3, the apparatus 11 includes the cutting oxygen control valve 17 and the preheat control valve 27. As described with respect to FIG. 1, the preheat control valve 27 implies that a preheat oxygen valve and fuel valve are adjusted in a predetermined portion such that merely by increasing the preheat control valve both oxygen and fuel are increased in the desired proportions. The torch has the tip 23 and the first temperature sensor 31 for sensing surface temperature $T_s$ and the second temperature sensor 33 for sensing the kerf temperature $T_k$. The temperature sensors are connected with the microprocessor 29 by way of temperature input module 77. There is an on-off switch 79 connected with the microprocessor 29 by way of halt line 81. In actual practice, this same on-off switch and halt line will be employed in the embodiment of FIG. 1, as will be described in more detail with respect to FIG. 4 later hereinafter. There is a drive on-off switch 83 for moving the bank of torches to cut the predetermined pattern in the metallic plate once the temperature of the plate at the cut is brought up to the predetermined standard. The microprocessor 29 sends out the cutting oxygen control signals and the preheat control signals in the embodiment of FIG. 3.

The microprocessor has pre-programmed into it a second algorithm, referred to hereinafter as algorithm 2, for carrying out the respective control operations responsive to the sensed temperatures.

ALGORITHM 2

$T_k$=temperature in the kerf
$T_s$=temperature at surface on shoulder of the kerf front
hi=high; lo=low; ok=within respective predetermined standards

| CONDITION | RESPONSE |
|---|---|
| $T_k$ = ok & $T_s$ = ok | no change |
| $T_k$ = hi & $T_s$ = ok | decrease oxygen |
| $T_k$ = lo & $T_s$ = ok | increase oxygen |
| $T_s$ = lo | increase preheat |
| $T_s$ = hi | decrease preheat |

Figure 4:
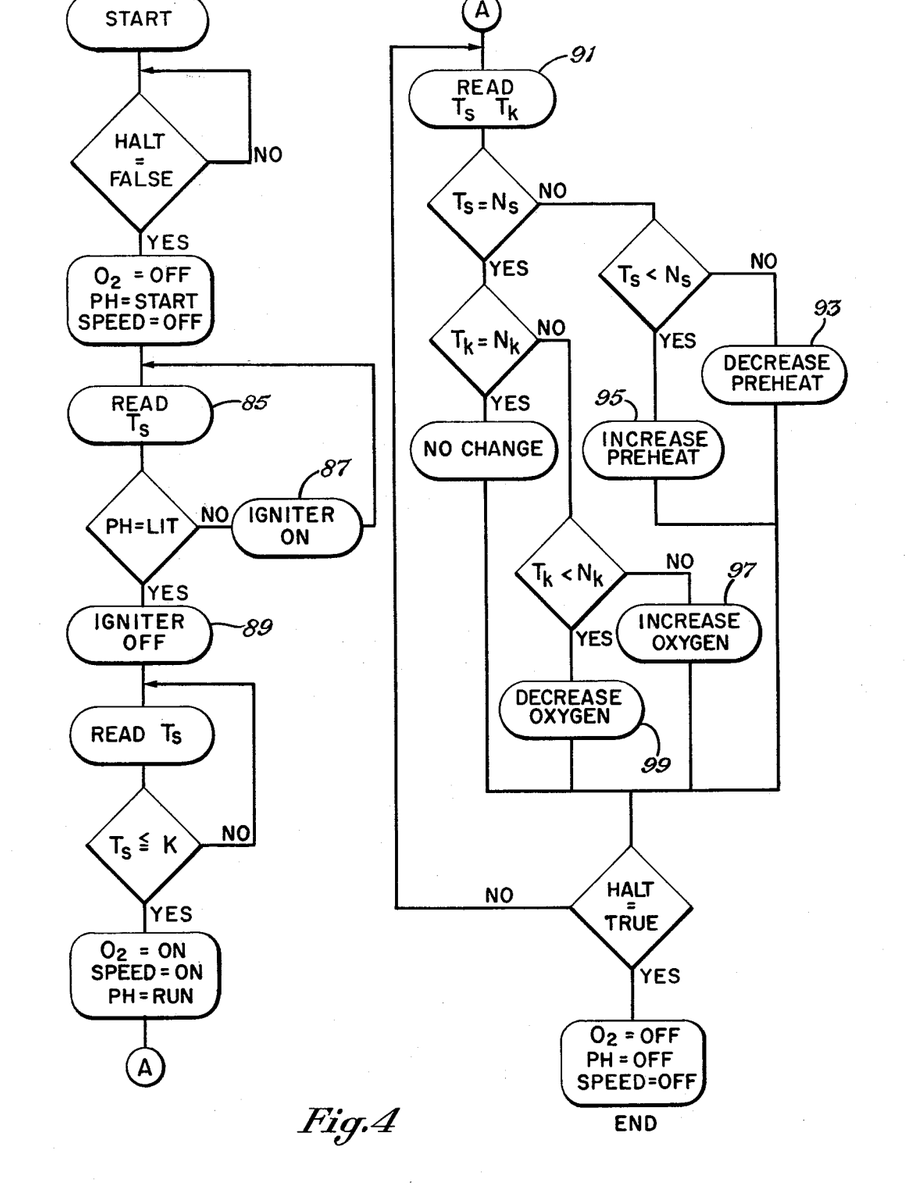
FIG. 4 is a flow diagram for cutting torch control system to maintain quality of flame cut surface by controlling pre-heat and cutting oxygen gas flows.

The flow diagram for the microprocessor to carry out the algorithm is illustrated in FIG. 4. It is to be understood that the first part of FIG. 4 is the general, or main, program and the circle with an "A" in it is employed in both FIGS. 2 and 4 to denote re-entry into this main part of the program. The second half of the program out to the right is the embodiment for FIG. 3 alone. The program in the flow diagram is initiated after the torch tips are set up initially by turning on the respective oxygen, fuel, preheat fuel and preheat oxygen. In this embodiment, it is not necessary to bring the spot on the plate to its melting, or kindling temperature manually but the program can be employed to do so automatically. The microprocessor 29 is setting at "turn on" and is ready for start of operations. The operator pushes the start button. The microprocessor 29 checks to see if the operator has turned on the on-off switch 79. If he has not turned on the switch, the answer is no at the halt equal false and the microprocessor merely loops at this point. Once the on-off switch is turned on, the program allows the microprocessor to activate and check if the oxygen has been turned on, to see if the preheat has been started and to see if the speed drive is off. If the equipment is in a condition to go, the microprocessor drops through and reads the surface temperature in the block 85. The microprocessor then asks the question "is the preheat lit (PH EQUAL LIT)". If the answer is no, the igniter is turned on in block 87 and the microprocessor circles in the loop until the $T_s$ becomes high enough to convince it that the preheat is lit. At this point it turns off the igniter in block 89 and then checks to see if $T_s$ is equal to or above the kindling temperature K. If no, the microprocessor loops until the kindling temperature is reached. When the kindling temperature is reached, the cutting oxygen is turned on, the drive switch and speed switch is turned on and the preheater is adjusted to the run condition. This is somewhat less than the initial start position, since less preheat is necessary when the cutting oxygen is employed to burn the metal. This part of the automated process can be employed in either the embodiment of FIG. 1 or FIG. 3. Referring further to FIG. 3, the point "A" connotes entry into the algorithm loop. After the microprocesser reads $T_s$ and $T_k$ in block 91 it compares to see if the surface temperature $T_s$ is up to the normal, or predetermined standard, $N_s$. If no, the microprocessor proceeds along the line marked "no" to see if $T_s$ is less than $N_s$. If it is not then the microprocessor decreases the preheat in block 93. If, on the other hand, the $T_s$ is less than $N_s$ the microprocessor will increase the preheat in block 95 and either repeat a recycle, or exit to turn off the oxygen preheat and speed if the operator has turned off the switch 79 to give a halt equal true signal on the halt line 81. If, on the other hand, $T_s$ is equal to $N_s$ the algorithm proceeds to check if $T_k$ is equal to $N_k$. If no the microprocessor proceeds to the right along the line marked "no" to see if $T_k$ is less than $N_k$. If no then oxygen is increased in block 97. If $T_k$ is less than $N_k$ then oxygen is decreased in block 99. If, on the other hand, $T_k$ is also equal to $N_k$ then no change is signalled and the computer keeps the burning at the optimum in terms of both the preheat and cutting oxygen; then either recycles or exits, as hereinbefore.

When the cut is complete, the "halt equal true" signal will allow the microprocessor to end the operations by turning off the oxygen, the preheat, and the speed.

Figures 5, 6:
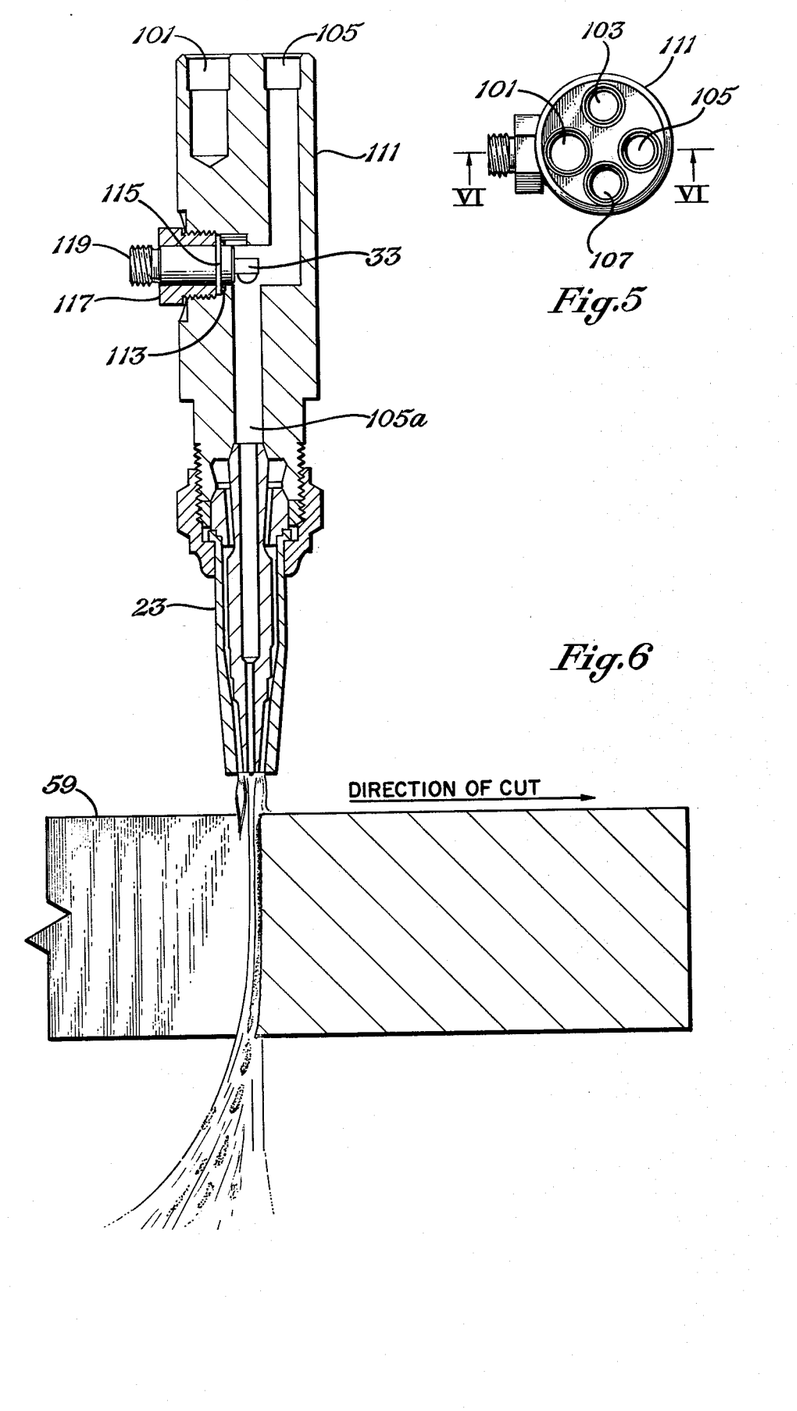
FIG. 5 is a partial top view of the torch tip holder having a temperature sensor disposed therewithin for sensing the temperature in the kerf.
FIG. 6 is a partial cross-sectional view taken along the lines VI—VI of FIG. 5.

If desired, the sensor sensing the temperature in the kerf could be mounted internally of the torch body or the torch tip holder similarly as shown in FIGS. 5 and 6. Referring to the elongated tip and holder of FIGS. 5 and 6, there is provided a preheat oxygen passageway 101, a fuel passageway 103, a cutting oxygen passageway 105 and a mixer passageway 107. Actually, the preheat oxygen passageway is cut into the mixer passageway 107 by a passageway (not shown). The cutting oxygen flows down to passageway 105 and then past the temperature sensor 33. The temperature sensor 33 senses light coming through the cutting oxygen passageway 105a, from the kerf having molten steel therein. The tip 23 connects with the holder 111. As is well recognized the holder is dovetailed into a bar on which a plurality of the tips are mounted for cutting simultaneously predetermined designs from the metallic plate. In the illustrated embodiment, the silicon photo diode serving as the temperature sensor 33 senses the light emitted from the lower part of the cut which lags the cutting front. While a silicon photo diode is illustrated in this embodiment, a light pipe, or tube, could be employed in a remote diode to sense the temperature. In the illustrated embodiment, the diode is held by a roll pin 113 which maintains alignment. A gasket 115 prevents leakage of the cutting oxygen when held in place by way of lock nut 117 with electrical connector 119 exteriorly thereof for suitable electrical interconnection.

From the foregoing it can be seen that this invention achieves the object delineated hereinbefore.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. In a method of cutting metallic plate in which fuel and oxygen are admixed and burned as they exit from a torch tip as a pre-heat flame for heating a spot on the metal plate, in which cutting oxygen is directed through the hot molten metal spot on the plate to complete a cut therethrough, in the process forming a kerf, and in which the torch tip is moved along a predetermined path to cut the metallic plate therealong,
the improvement comprising:
 a. sensing the temperatures at a plurality of points adjacent the top and in the kerf of the cut of the metal plate; and
 b. responsive to the sensed temperatures, making appropriate pre-designated changes to effect more nearly optimum cut of the steel plate.

2. The method of claim 1 wherein said changes are made automatically responsive to a pre-programmed algorithm.

3. The method of claim 2 wherein a microprocessor is connected with said plurality of temperature sensors and employs said pre-programmed algorithm to effect respective changes in respective parameters in accordance therewith.

4. The method of claim 3 wherein said microprocessor and said algorithm or for each single torch tip and said algorithm is as follows:
$T_k$ = temp. in kerf
$T_s$ = temp. at surface on shoulder of kerf front
hi = high; lo = low; ok = within the standard

| CONDITION | RESPONSE |
| --- | --- |
| $T_k$ = hi & $T_s$ = lo | reduce speed of movement of torch tip |
| $T_k$ = ok & $T_s$ = lo | increase preheat, including both fuel and oxygen |
| $T_k$ = hi & $T_s$ = ok | increase cutting oxygen |
| $T_k$ = ok & $T_s$ = hi | reduce preheat |
| $T_k$ = lo & $T_s$ = hi | increase speed |
| $T_k$ = lo & $T_s$ = ok | reduce cutting oxygen |
| $T_k$ = hi & $T_s$ = hi | reduce preheat |
| $T_k$ = lo & $T_s$ = lo | increase preheat |
| $T_k$ = ok & $T_s$ = ok | no change |

5. The method of claim 3 wherein said microprocessor and said algorithm are for ganged torches wherein individual torch speed cannot be changed without changing speed of other torches.

6. The method of claim 5 wherein said algorithm is as follows:
$T_k$ is the temperature in the kerf
$T_s$ is the temperature at the surface
hi = high; lo = low; ok = within respective predetermined standards

| CONDITION | RESPONSE |
| --- | --- |
| $T_k$ = ok & $T_s$ = ok | no change |
| $T_k$ = hi & $T_s$ = ok | decrease oxygen |
| $T_k$ = lo & $T_s$ = ok | increase oxygen |
| $T_s$ = lo | increase preheat |
| $T_s$ = hi | decrease preheat |

7. The method of claim 1 wherein said sensing of said temperatures is performed with infra-red sensors sensing the temperatures through radiant energy emission wave length.

8. The method of claim 7 wherein there are two said sensors and the surface temperature sensor senses its temperature within no more than ten inches radially from the tip and the temperature of the kerf is sensed down in the kerf behind the torch tip as the cut is being made.

9. The method of claim 8 wherein said temperature at the surface is sensed within one-fourth inch radially from the tip.

10. The method of claim 8 wherein the temperature within the kerf is sensed at a distance more than half the thickness of the plate from the surface.

11. The method of claim 1 wherein high frequency acoustic emissions are monitored adjacent the plate being cut; and are used to sound an alarm if a bad cut is experienced.

12. The method of claim 1 wherein acoustic emissions are monitored near the tip and are employed to sound an alarm if the tip becomes plugged.

13. The method of claim 12 wherein the acoustic emissions near the surface of the plate are monitored and are employed also to sound an alarm if a bad cut is experienced.

14. In apparatus for cutting metal plate and including:
 a. oxygen source and supply passageway for pre-heat oxygen and cutting oxygen;
 b. fuel source and supply passageway for pre-heating the metal plate;
 c. cutting oxygen valve;
 d. pre-heat oxygen valve;
 e. fuel valve;
 f. torch tip connected by respective passageways with said valves and having respective pre-heat and cutting oxygen passageways; and
 g. moving means for moving said torch tip along a pre-determined path;
the improvement comprising:
 h. first means for controlling said cutting oxygen valve;
 i. second means for controlling said pre-heat fuel and oxygen valve;
 j. a plurality of temperature sensors placed and directed to sense the temperature at the surface near the shoulder of the kerf front and in the kerf, respectively; and
 k. control means connected with said temperature sensors and drivingly connected with said first and second means and adapted to control respective ones of said valves responsive to said temperatures sensed in relation to pre-determined standards.

15. The apparatus of claim 14 wherein said control means includes a pre-programmed algorithm for determining the respective direction of control of said valves responsive to said temperatures sensed with respect to said standards.

16. The apparatus of claim 15 wherein said control means includes, also, a microprocessor employing said pre-programmed algorithm to effect respective changes in respective said valves.

17. The method of claim 14 wherein a fourth means is provided for controlling the rate of movement of said moving means, said control means is drivingly connected also with said fourth means for controlling the rate of movement of said moving means, also, in response to said temperatures sensed; said control means includes a pre-programmed algorithm and a microprocessor employing the same for determining the respective directions of control of the first through fourth means and the algorithm is as follows:

$T_k$ = temp. in the kerf
$T_s$ = temp. at the surface on shoulder of kerf front
hi = high; lo = low; ok = within the standard

| CONDITION | RESPONSE |
|---|---|
| $T_k$ = hi & $T_s$ = lo | reduce speed of movement of torch tip |
| $T_k$ = ok & $T_s$ = lo | increase preheat, including both fuel and oxygen |
| $T_k$ = hi & $T_s$ = ok | increase cutting oxygen |
| $T_k$ = ok & $T_s$ = hi | reduce preheat |
| $T_k$ = lo & $T_s$ = hi | increase speed |
| $T_k$ = lo & $T_s$ = ok | reduce cutting oxygen |
| $T_k$ = hi & $T_s$ = hi | reduce preheat |
| $T_k$ = lo & $T_s$ = lo | increase preheat |
| $T_k$ = ok & $T_s$ = ok | no change |

18. The apparatus of claim 14 wherein said microprocessor and said algorithm are for ganged torches wherein individual torch speed cannot be changed without changing the speed of other torches.

19. The apparatus of claim 18 wherein said algorithm is as follows:

$T_k$ is the temperature in the kerf
$T_s$ is the temperature at the surface
hi = high; lo = low; ok = within respective predetermined standards

| CONDITION | RESPONSE |
|---|---|
| $T_k$ = ok & $T_s$ = ok | no change |
| $T_k$ = hi & $T_s$ = ok | decrease oxygen |
| $T_k$ = lo & $T_s$ = ok | increase oxygen |
| $T_s$ = lo | increase preheat |
| $T_s$ = hi | decrease preheat |

20. The apparatus of claim 14 wherein said temperature sensors are infra-red sensors sensing the temperature through respective radiant energy emitted.

21. The apparatus of claim 20 wherein there are two said temperature sensors and said temperatures are sensed respectively at the surface, no more than ten inches away from the torch tip and the temperature in the kerf is down into the kerf behind the tip.

22. The apparatus of claim 21 wherein said temperature sensors sensing the temperature at the surface is directed to sense the temperature in the quarter inch radially of the torch tip.

23. The apparatus of claim 21 wherein the temperature sensor sensing the temperature within the kerf sensing the temperature below one-half plate thickness away from the surface.

24. The apparatus of claim 20 wherein the temperature sensor sensing temperature in the kerf is integrated into the torch tip.

25. The apparatus of claim 14 wherein an acoustic emissions sensor is employed adjacent the surface of the metallic plate and is connected with the control means, the control means is responsive to detect variance from the acoustic emissions received from a predetermined standard; a bad cut alarm is provided and connected with said control means and said control means is adapted to sound the bad cut alarm in the event of departure of the acoustic emissions from a predetermined standard.

26. The apparatus of claim 14 wherein an acoustic emissions sensor is provided adjacent said torch tip; said torch tip acoustic emissions sensor is connected with said control means; said control means is adapted to detect variance from a predetermined standard; a plugged tip alarm is provided and connected with said control means and said control means is adapted to sound the plugged tip alarm in the event of departure of said emitted acoustic energy from a predetermined standard for said tip.

27. The apparatus of claim 26 wherein a plate acoustic emission sensor is emplaced adjacent the surface of the metallic plate and is connected with said control means; said control means is also adapted to determine when the plate acoustic emissions departs a predetermined standard for the acoustic energy for being emitted by the cut plate to determine a bad cut, said control means is adapted to determine when the emitted acoustic energy departs the predetermined standard for the metallic plate; a bad cut alarm is provided and connected with said control means and said control means is adapted to energize the bad cut alarm upon the occurence of a departure from the predetermined standard for the acoustic emitted energy for the metallic plate.

* * * * *

UNITED STATES PATENT AND TRADEMARK OFFICE
CERTIFICATE OF CORRECTION

PATENT NO. : 4,439,249
DATED : March 27, 1984
INVENTOR(S) : Gurvinder P. Singh and William D. Jolly It is certified that error appears in the above—identified patent and that said Letters Patent is hereby corrected as shown below:

Claim 14, line 1, please delete "In" and substitute therefor --An--.
Claim 17, line 1, please delete "method" and substitue therefor --apparatus--.
Claim 22, line 2, please delete "is" and substitute therefor --are--.
Claim 27, column 14, lines 6 and 7 please delete "occurence" and substitute therefor --occurrence--.

Signed and Sealed this

Twenty-second Day of July 1986

[SEAL]

Attest:

DONALD J. QUIGG

Attesting Officer

Commissioner of Patents and Trademarks